(12) United States Patent
Staal et al.

(10) Patent No.: US 12,715,536 B2
(45) Date of Patent: Aug. 25, 2026

(54) REAR WHEEL AND SEAT LINKAGE MECHANISM

(71) Applicant: Honda Motor Co., Ltd., Tokyo (JP)

(72) Inventors: Matthew B. Staal, Torrance, CA (US); Michael Jin Kim, Long Beach, CA (US); Jackie P. Porchay, Torrance, CA (US); Ming Hsein Lee, Taichung (TW); Ding Jong Chou, Taichung (TW); Sheng Yu Yu Huang, Taichung (TW)

(73) Assignees: Honda Motor Co., Ltd., Tokyo (JP); JD Components Co., Ltd., Taichung City (TW)

( * ) Notice: Subject to any disclaimer, the term of this patent is extended or adjusted under 35 U.S.C. 154(b) by 398 days.

(21) Appl. No.: 18/240,810

(22) Filed: Aug. 31, 2023

(65) Prior Publication Data

US 2025/0074533 A1 Mar. 6, 2025

(51) Int. Cl.

*B62K 11/02* (2006.01)
*B62J 1/08* (2006.01)
*B62K 11/14* (2006.01)
*B62K 15/00* (2006.01)
*B62K 25/02* (2006.01)

(52) U.S. Cl.

CPC ................. *B62K 11/02* (2013.01); *B62J 1/08* (2013.01); *B62K 11/14* (2013.01); *B62K 15/00* (2013.01); *B62K 25/02* (2013.01)

(58) Field of Classification Search

CPC ................................... B62J 1/08; B62K 11/02
See application file for complete search history.

(56) References Cited

U.S. PATENT DOCUMENTS 9,561,832 B2 2/2017 He et al.
11,981,389 B1 * 5/2024 Kim ......................... B62J 45/00
12,005,988 B1 * 6/2024 Staal ...................... B62K 11/14
12,275,482 B1 * 4/2025 Staal ........................ B62J 25/04
12,441,429 B1 * 10/2025 Staal ...................... B62K 15/00
12,459,597 B1 * 11/2025 Ziraldo .................. B62K 15/00
(Continued)

FOREIGN PATENT DOCUMENTS

CN 102700663 B 10/2012
CN 104875829 A 9/2015
(Continued)

*Primary Examiner* — Minnah L Seoh
*Assistant Examiner* — Hosam Shabara
(74) *Attorney, Agent, or Firm* — Plumsea Law Group, LLC

(57) ABSTRACT

A rear wheel and seat linkage mechanism for a personal transport device and a corresponding personal transport device are provided. The mechanism includes a carrier, configured to slide along a track of a sliding mechanism. The mechanism also includes a seat post, connected at a first end to a top portion of the carrier and connected at a second end to a protruding seat pole. The mechanism further includes a rear wheel arm, comprising the rear wheel at a first end and connected at a second end to a bottom portion of the carrier. In the mechanism, the carrier is configured to slide between a front of the track and a rear of the track to transition, in unison, the seat post and the protruding seat pole above the track and the rear wheel and the rear wheel arm below the track between an unfolded configuration and a folded configuration.

20 Claims, 11 Drawing Sheets

(56) References Cited

U.S. PATENT DOCUMENTS

| | | | | |
|---|---|---|---|---|
| 2005/0230933 | A1 | 10/2005 | Woo | |
| 2011/0193313 | A1 | 8/2011 | Yun | |
| 2025/0074536 | A1 * | 3/2025 | Ziraldo | B62K 15/006 |

FOREIGN PATENT DOCUMENTS

| | | | | | |
|---|---|---|---|---|---|
| CN | 105539691 | A | * | 5/2016 | B62K 5/02 |
| CN | 206155702 | U | | 5/2017 | |
| CN | 107434001 | A | | 12/2017 | |
| CN | 108674553 | A | | 10/2018 | |
| CN | 109665014 | A | | 4/2019 | |
| CN | 111483542 | A | | 8/2020 | |
| FR | 3074135 | A1 | | 5/2019 | |
| KR | 20170089289 | A | * | 8/2017 | B62K 19/04 |
| WO | 2018082488 | A1 | | 5/2018 | |

* cited by examiner

REAR WHEEL AND SEAT LINKAGE MECHANISM

BACKGROUND

This disclosure relates generally to vehicles, and in particular to a rear wheel and seat linkage mechanism for a compact personal transport device that is convertible between a folded configuration and an unfolded configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for use in shorter trips in a city environment due to their compact size, ease of use, mobility, and the fact that they may be folded as needed for ease of portability. They may also be useful for covering the first mile or last mile of a trip that is the link between a user's origin or destination and another transportation means, hub or mass transit network. One existing barrier to widespread use of such compact personal transport devices is the time needed to set up and collapse the devices before and after their use.

Accordingly, there is a need in the art for an improved compact personal transport device that can be set up and collapsed quickly.

SUMMARY

In one aspect, a rear wheel and seat linkage mechanism for a personal transport device includes a carrier, configured to slide along a track of a sliding mechanism. The mechanism also includes a seat post, connected at a first end to a top portion of the carrier and connected at a second end to a protruding seat pole. The mechanism further includes a rear wheel arm, connected to the rear wheel at a first end and connected at a second end to a bottom portion of the carrier. The carrier is configured to slide between a front of the track and a rear of the track to transition, in unison, the seat post and the protruding seat pole above the track and the rear wheel and the rear wheel arm below the track between an unfolded configuration and a folded configuration.

In another aspect, a personal transport device includes an outer casing. The personal transport device also includes a rear wheel. The personal transport device further includes a seat. The personal transport device additionally includes a linkage mechanism. The linkage mechanism includes a carrier, configured to slide along a track of a sliding mechanism. The linkage mechanism also includes a seat post, connected at a first end to a top portion of the carrier and connected at a second end to a protruding seat pole. The linkage mechanism further includes a rear wheel arm, connected to the rear wheel at a first end and connected at a second end to a bottom portion of the carrier. The carrier is configured to slide between a front of the track and a rear of the track to transition, in unison, the seat post and the protruding seat pole above the track and the rear wheel and the rear wheel arm below the track between an unfolded configuration and a folded configuration.

In another aspect, a personal transport device includes an outer casing. The personal transport device also includes a rear wheel. The personal transport device further includes a seat. The personal transport device additionally includes a linkage mechanism. The linkage mechanism includes a carrier, configured to slide along a track of a sliding mechanism. The carrier is configured to slide between a front of the track and a rear of the track. By such sliding, the carrier transitions, in unison, a seat post connected at a first end to a top portion of the carrier and connected at a second end to a protruding seat pole, situated above the track, and a rear wheel arm, comprising the rear wheel at a first end and connected at a second end to a bottom portion of the carrier, situated below the track, between an unfolded configuration and a folded configuration. The personal transport device also includes a steering assembly, comprising a handlebar. The steering assembly is configured to transition between a vertical position in the unfolded configuration and a collapsed position in the interior of the outer casing in the folded configuration.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
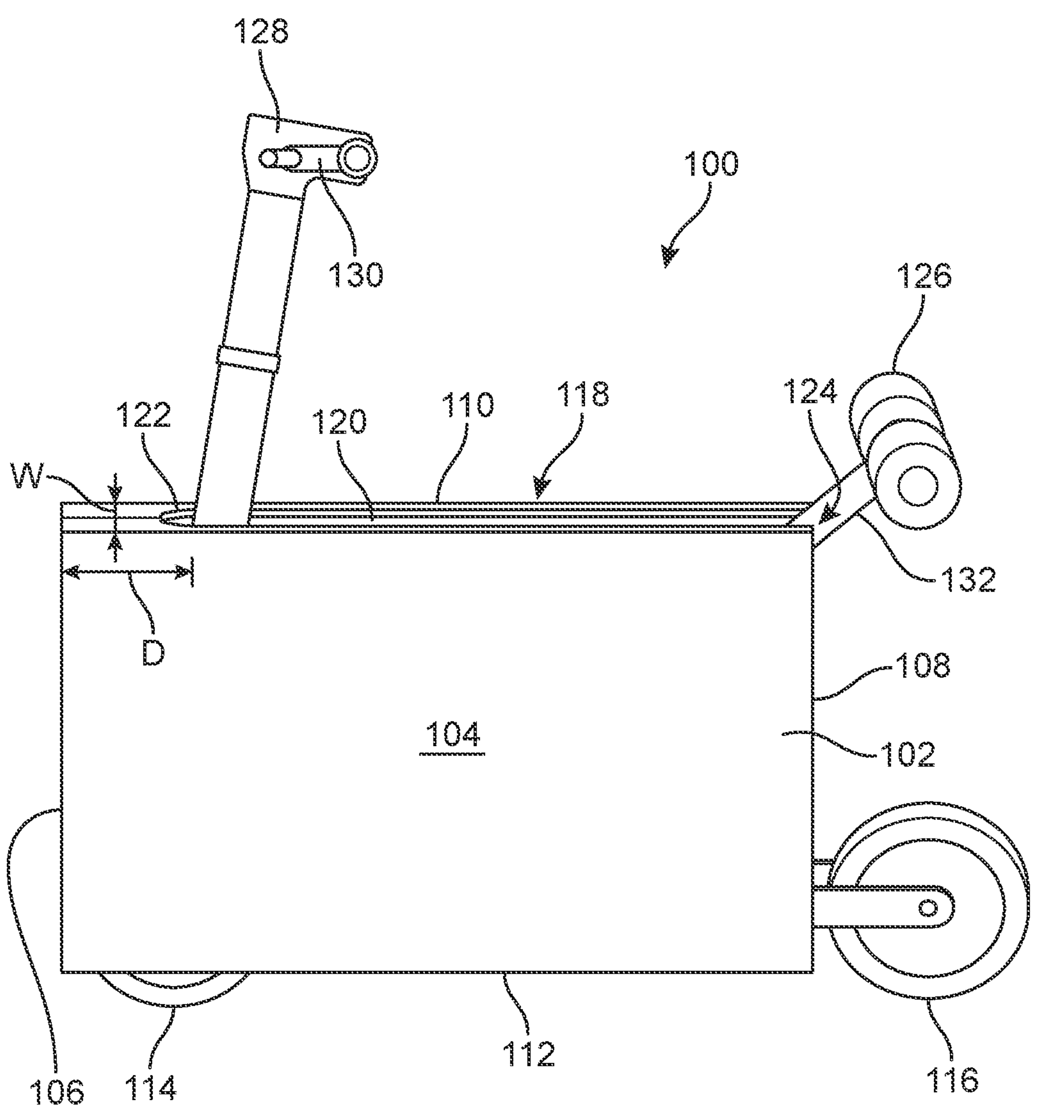
FIG. 1 is a side view of an example embodiment of a compact personal transport device in the form of an electric scooter in an unfolded configuration in accordance with aspects of the present disclosure.

Embodiments of a compact personal transport device with a rear wheel and seat linkage mechanism that provides for a connection between the rear wheel sliding mechanism and a seat post are provided. Such a connection causes the seat post to be raised or lowered in unison with the extension or retraction of the rear wheel.

For example, the rear wheel arm and the seat post are connected via a linkage mechanism that is attached to a sliding mechanism movable inside the vehicle frame. When the sliding mechanism moves toward the front of the vehicle, the sliding mechanism lowers the protruding seat pole and the sliding mechanism retracts, in unison, the rear wheel into the vehicle frame. When the sliding mechanism moves toward the rear of the vehicle, the sliding mechanism raises the protruding seat pole and the sliding mechanism extends the rear wheel out of the vehicle frame.

The techniques described in connection with the present embodiments may be used to provide a personal transport device having a convenient rear wheel and seat linkage mechanism. Such a rear wheel and seat linkage mechanism allows a user to sit on the seat in the unfolded configuration and to quickly collapse the personal transport device to the folded configuration. In the folded configuration, the personal transport device has a compact form factor that allows a user to carry it in a primary vehicle, on public transportation, and/or on other forms of transportation to be used for "last-mile" or "first-mile" trips to and from a destination. As described, in the folded or stowed configuration, a seat of the personal transport device may be removed from the seat post and stowed securely in the interior of the personal transport device. Thus, the seat has an allocated destination that keeps the seat safe and also avoids having the seat interfere with the folding process.

The example embodiments are described herein with reference to a personal transport device in the form of an electric scooter. As used herein, an electric scooter is a term used mainly to describe a scooter that is electrically powered. For example, such an electric scooter is a type of personal transport device that is gaining in ridership and usage in many locations. The principles of the example embodiments described herein may principally be applied to electric scooters, but may be applied to scooters with other energy sources and manual scooters. The principles of the examples may apply to other types of personal transport devices, such as bicycles, unicycles, mopeds, skateboards, kickboards, wheelchairs, personal transporters, or the like, to the extent that they are relevant.

In the example embodiments described herein, the electric scooter has an outer casing having a generally rectangular shape, including two flat sides having a length that is longer than a height. For example, the outer casing may actually have a rectangular shape, or it may have a generally rectangular shape with rounded corners. In addition, the electric scooter of the present embodiments has a width that is substantially smaller than the length and/or height of the electric scooter. In the example embodiments, the electric scooter may be transitioned between an unfolded configuration and a folded configuration. In the unfolded configuration, components of the electric scooter are in positions extending from outside of the rectangular outer casing so that the electric scooter may be operated or ridden by a user. In the folded configuration, components of the electric scooter are folded or stowed inside the outer casing.

Referring now to FIG. 1, an example embodiment of a personal transport device 100, (e.g., in the form of an electric scooter 100) is shown. In some embodiments, electric scooter 100 may be transitioned or converted between a stowed or folded configuration and a riding or unfolded configuration. In the folded configuration, components of electric scooter 100 are stored or disposed inside an outer casing 102. By having the components of electric scooter 100 be contained in the outer casing 102, they are less obtrusive when trying to carry the electric scooter 100 when it is not being used.

In the unfolded configuration, components of electric scooter 100 are folded or opened from their stored positions to extended positions outside of outer casing 102 so that a user may operate or ride electric scooter 100. Being in the unfolded configuration implies that the electric scooter 100 is in a riding configuration for use as a vehicle, such that the seat 126 and the rear wheel 116 are in a position ready for use. Moreover, the steering assembly 128 is aligned vertically and ready for use, in that the handlebars 130 are extended for use in steering.

Figure 5:
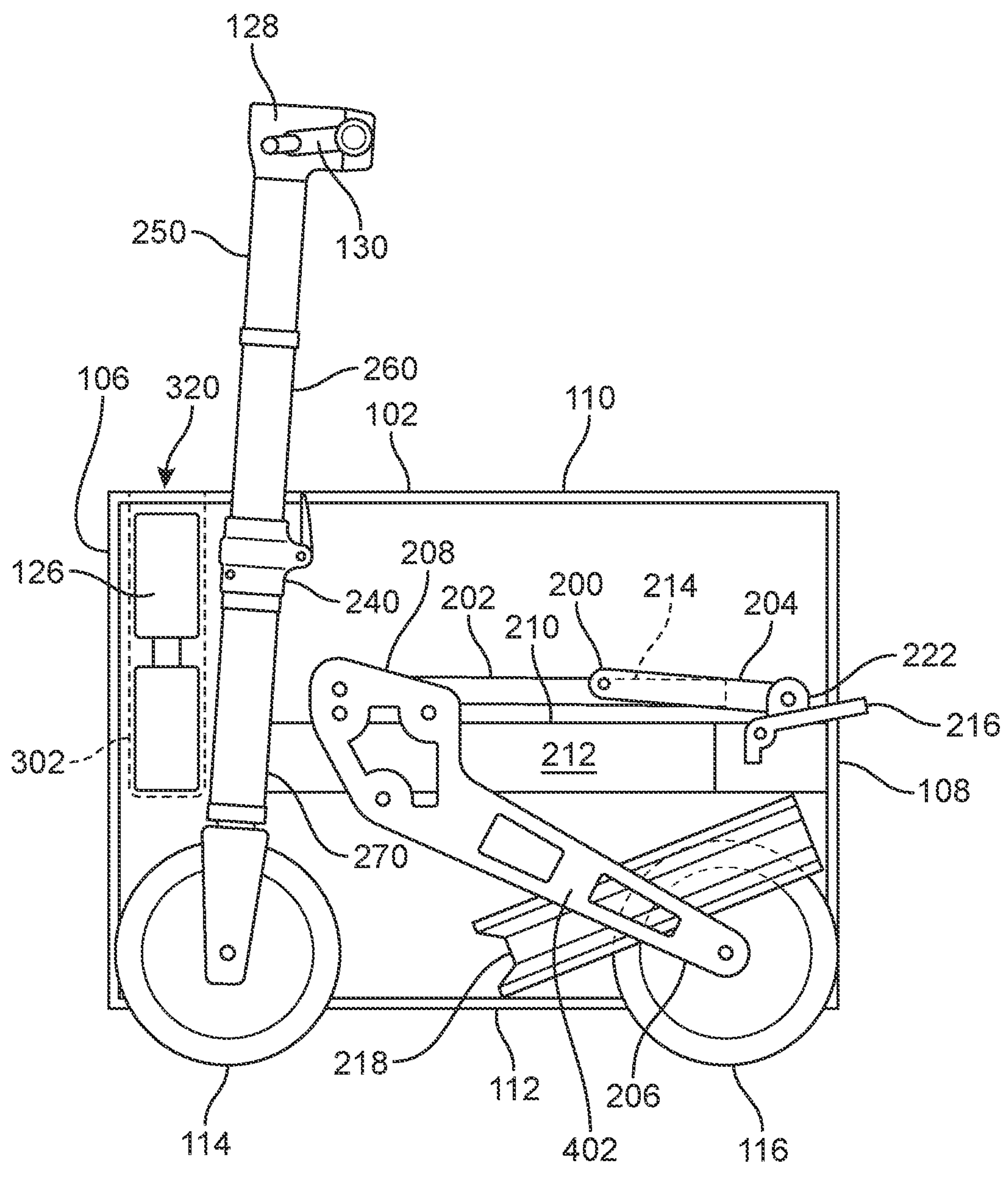
FIG. 5 is a side view showing internal components of the compact personal transport device of FIG. 1, in a configuration with a folded seat post and a retracted rear wheel, in accordance with aspects of the present disclosure.
Figure 9:
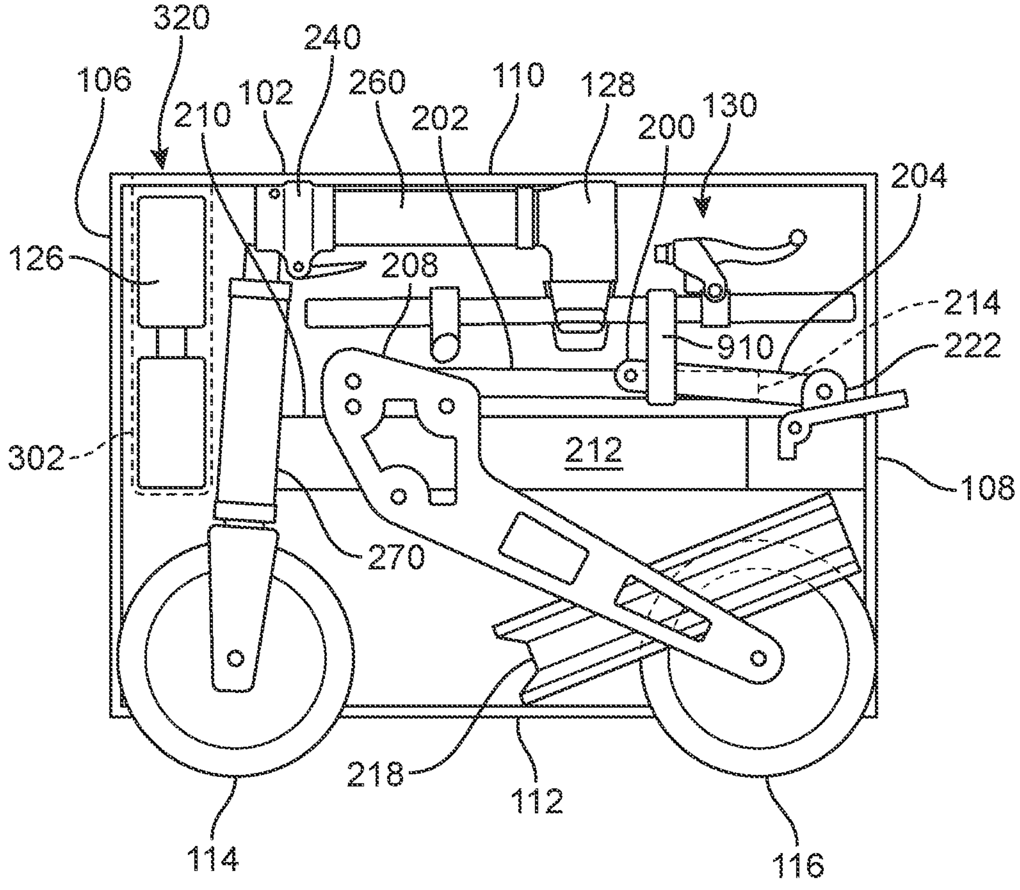
FIG. 9 is a side view showing internal components of the compact personal transport device of FIG. 1, in a configuration with a folded steering assembly, in accordance with aspects of the present disclosure.

As shown in FIG. 1, electric scooter 100 is in the unfolded configuration. FIG. 5, described in further detail below, shows electric scooter 100 in a partially folded configuration with the exposed seat pole 132 and rear wheel 116 stowed. For example, FIG. 5 shows that the exposed seat pole 132 and rear wheel 116 are stowed in unison, through the movement of a unified linkage mechanism. However, in FIG. 5, the steering assembly 128 is still extended. FIG. 9, described in detail below, shows electric scooter 100 in the fully folded configuration. In the fully folded configuration, the steering assembly 128 has been collapsed and folded in a manner that allows it to fold into outer casing 102, as well as the exposed seat pole 132 and rear wheel 116.

In the embodiment shown in FIG. 1, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface.

Outer casing 102 of the electric scooter 100 extends between a front edge 106 of the electric scooter 100 and an opposite rear edge 108 of the electric scooter 100. Outer casing 102 of the electric scooter 100 also extends between a top edge 110 of the electric scooter 100 and an opposite bottom edge 112 of the electric scooter 100. Front edge 106, rear edge 108, top edge 110, and bottom edge 112 are each substantially straight and define an outer perimeter of rectangular-shaped outer casing 102 of electric scooter 100. However, in some embodiments these edges include curved corners or are otherwise angled or rounded.

In the embodiment shown in FIG. 1, a front wheel 114 is visible along bottom edge 112 of electric scooter 100 near front edge 106. Electric scooter 100 also includes a rear wheel 116 that is shown as being extended outside of outer casing 102 (i.e., in the unfolded or riding configuration as shown in FIG. 1) behind bottom edge 112 near rear edge

108. Rear wheel 116 is configured to slide out from or retract inside of outer casing 102 in the folded configuration via a linkage mechanism, as described further below. Such motion occurs in unison with that of an exposed seat pole 132, as discussed further, below.

Electric scooter 100 includes a top surface 118 disposed between first side surface 104 and the opposite second side surface. In an example embodiment, top surface 118 includes an opening 120 extending substantially along the length of electric scooter 100. (i.e., from front edge 106 to rear edge 108). In one embodiment, opening 120 is disposed spaced from front edge 106 of electric scooter 100 and extends all the way to rear edge 108. For example, as shown in FIG. 1, opening 120 extends along top surface 118 from a first end 122 to a second end 124 located at rear edge 108. In this embodiment, first end 122 of opening 120 is spaced from front edge 106 by a distance (D) so that opening 120 is offset on top surface 118.

In some embodiments, opening 120 extends to rear edge 108 along top surface 118 and partially extends down rear edge 108. In this embodiment, opening 120 is in the form of a slot disposed between first side surface 104 and the opposite second side surface. Such a slot is present to allow the retraction and extension of elements that protrude from the exterior of outer casing 102 of electric scooter 100 during the folding and unfolding, as discussed further below. In particular, the opening 120 allows for the retraction and extension of the exposed seat pole 132. The opening 120 also allows for the retraction and extension of the steering assembly 128.

In some embodiments, electric scooter 100 includes components configured to allow a user to ride electric scooter 100 in the unfolded configuration. For example, in this embodiment, electric scooter 100 includes a seat 126 and a steering assembly 128. While seat 126 is shown as being cylindrical, seat 126 may take on a number of forms and shapes in various embodiments. In one embodiment, seat 126 is configured to mount to the exposed seat pole 132 that is attached internally to the inside of electric scooter 100 (e.g., inside outer casing 102). In FIG. 1, steering assembly 128 is configured to control orientation of front wheel 114 to allow a user to steer electric scooter 100 in the unfolded configuration. In an example embodiment, steering assembly 128 includes a handlebar 130 that is configured to receive hands of a user to steer front wheel 114.

It is to be understood that a personal transport device according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described in the present disclosure.

Additionally, the discussion of embodiments as presented focuses on the simultaneous retraction of the rear wheel 116 and the exposed seat pole 132. The discussion also discusses aspects of the retraction of steering assembly 128 and handlebar 130. An electric scooter 100 may include additional elements, used for riding the electric scooter 100 such as pedals, footrests, or a kickstand that are not germane to the retraction of the rear wheel 116 and the exposed seat pole 132 and hence are not shown here.

Figure 2:
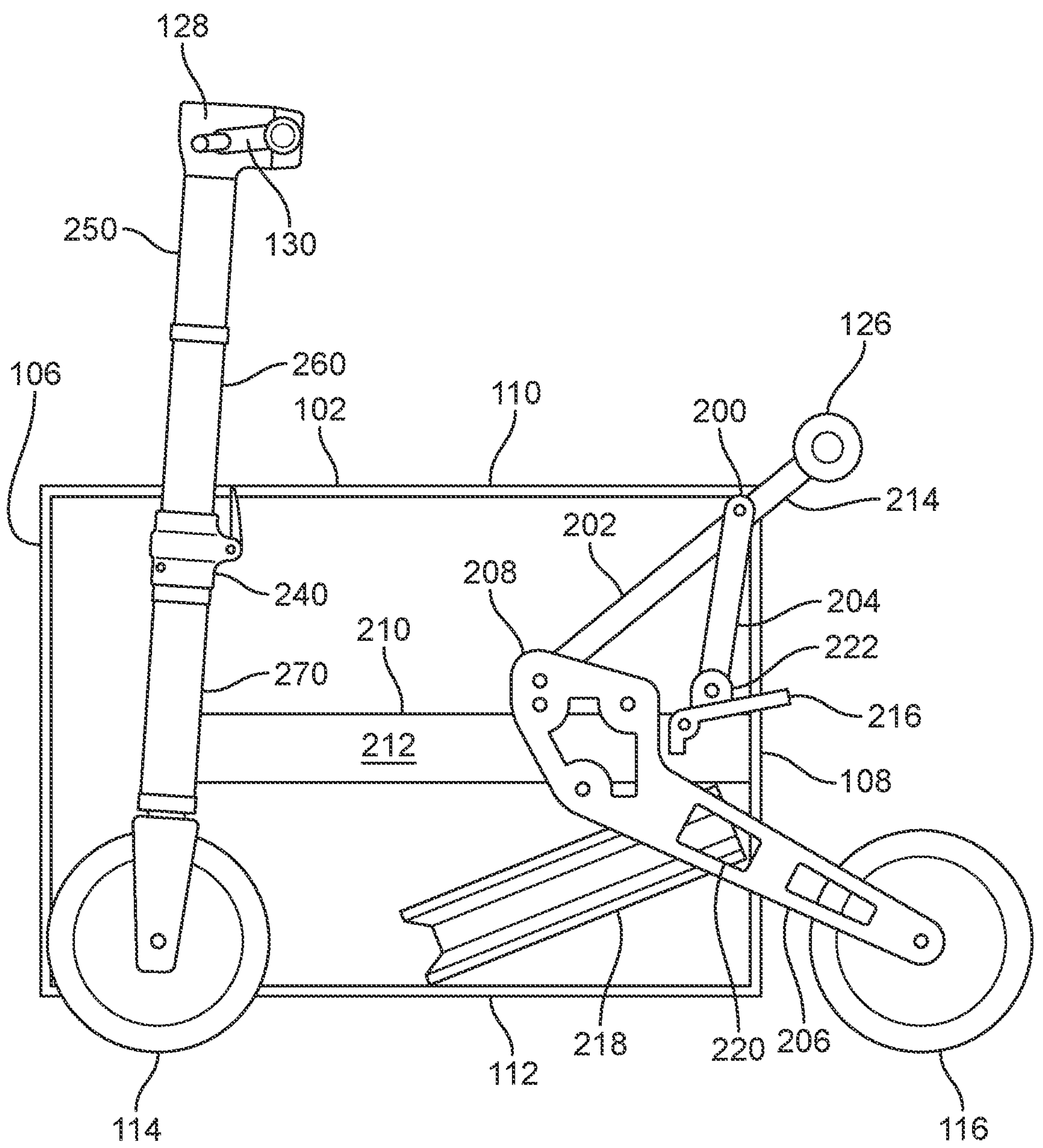
FIG. 2 is a side view showing internal components of the compact personal transport device of FIG. 1, in an unfolded configuration, in accordance with aspects of the present disclosure.

Referring now to FIG. 2, a side view showing the internal components of personal transport device in the form of electric scooter 100 is shown. In this view, outer casing 102 of electric scooter 100 is shown in cross-section so that the internal components are visible. In an example embodiment, electric scooter 100 includes hinge mechanism 200 connected to protruding seat pole 214, which is connected to seat 126. For example, protruding seat pole 214 may correspond to the exposed seat pole 132. When folding the protruding seat pole 214 into the body of electric scooter 100, if seat 126 is not foldable, then seat 126 is detached from the protruding seat pole 214, as shown further in FIG. 3. The hinge mechanism 200 allows protruding seat pole 214 to fold inwards into outer casing 102 of electric scooter 100. In this embodiment, hinge mechanism 200 is in the form of a hinge, but in other embodiments, hinge mechanism 200 may be any other type of appropriate mechanism that permits seat pole 214 to fold or collapse inwards into outer casing 102, such as a ball and socket joint, a pivot mechanism, or other apparatus.

In some embodiments, hinge mechanism 200 may be connected to a seat post 202 that is attached to seat pole 214 internally inside outer casing 102 of electric scooter 100. For example, in this embodiment, hinge mechanism 200 is disposed at a top end of seat post 202, and an opposite bottom end of seat post 202 is attached to a carrier 208 of a sliding mechanism 210.

Carrier 208 has a top portion and a bottom portion. The top portion of carrier 208 is attached to the bottom end of seat post 202. The bottom portion of carrier 208 is attached to a rear wheel arm 206, which is in turn attached to rear wheel 116. Carrier 208 is attached in a slidable manner to a track 212 of sliding mechanism 210. For example, carrier 208 may include a bearing assembly or similar apparatus to allow carrier 208 to slide back and forth (i.e., forwards towards front edge 106 or rearwards towards rear edge 108) along track 212 of sliding mechanism 210 in a substantially horizontal direction. In some embodiments, the carrier 208 includes a hollow region between the top portion of the carrier 208 and the bottom portion of the carrier 208 and the hollow region slides along the track 212. Accordingly, rear wheel 116 can move between an extended position (i.e., when electric scooter 100 is in the unfolded or riding configuration) and a folded position (i.e., when electric scooter 100 is in the folded or stowed configuration).

In some embodiments, seat post 202 may also be attached to a linkage 204 that mechanically connects seat post 202 to a fixed pivot component 222 inside outer casing 102 of electric scooter 100. For example, in this embodiment, a top end of linkage 204 is connected to the top end of seat post 202, the connection occurring at hinge mechanism 200, and a bottom end of linkage 204 is attached to an end portion of track 212 at the fixed pivot component 222.

The fixed pivot component 222 is held in place, while the electric scooter 100 is in an unfolded configuration or a fully folded configuration, by a fastening mechanism 216, discussed further below. With this arrangement, linkage 204 mechanically causes protruding seat pole 214 to collapse inside outer casing 102 of electric scooter 100 when carrier 208 attached to seat post 202 slides forward along track 212 (e.g., towards front edge 106) and similarly causes seat 126 to extend outside outer casing 102 of electric scooter 100 when carrier 208 slides rearwards along track 212 (e.g., towards rear edge 108). As an optional feature of embodiments, FIG. 2 also shows a lower track 218. An upper portion 220 of rear wheel arm 206 engages with lower track 218 and may slide inwards along lower track 218 as discussed further, below.

FIG. 2 also illustrates additional aspects of steering assembly 128. The handlebar 130 is situated at the top of steering assembly 128. Below handlebar 130 is an upper steering tube 250, which telescopes outward from lower steering tube 260. Below lower steering tube 260 is steering hinge 240. Steering hinge 240 is a hinge or joint that allows lower steering tube 260 to transition between a vertical alignment in the unfolded or riding configuration of the electric scooter 100 and a horizontal alignment in the folded or stowed configuration of the electric scooter 100. Below steering hinge 240, a front tube 270 attaches front wheel 114, track 212, and steering hinge 240 to each other, as shown in FIG. 2.

Figure 3:
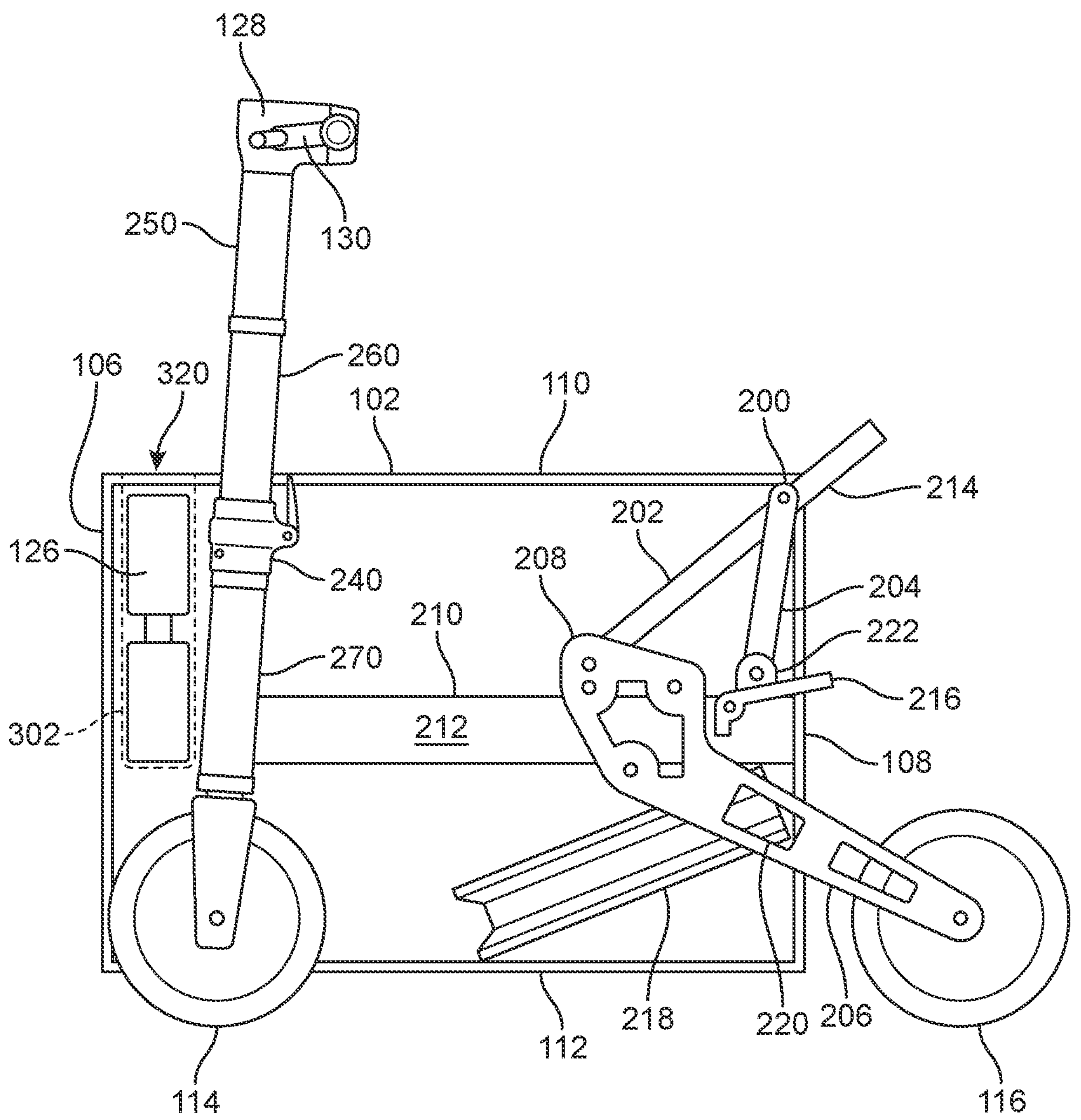
FIG. 3 is a side view showing internal components of the compact personal transport device of FIG. 1, in a configuration with a detached seat, in accordance with aspects of the present disclosure.

Referring now to FIG. 3, a side view showing internal components of the compact personal transport device of FIG. 1, in a configuration with a detached seat 126 is shown. In FIG. 3, protruding seat pole 214 is shown having seat 126 detached from the top of the protruding seat pole 214. In FIG. 3, seat 126 is stowed securely in a cavity 302 provided for secure storage of seat 126. As shown in FIG. 3, the cavity 302 is located in the front portion of electric scooter 100, in front of steering assembly 128 and above front wheel 114. For example, there may be an aperture 320 on top surface 110 in front of steering assembly 128, and a user of the electric scooter 100 may introduce the seat 126 into the cavity 302 by opening the aperture 320, sliding the seat 126 into the cavity 302, and then closing the aperture 320.

However, this is only an example of how to store the seat 126, and other examples are possible. For example, instead of using an aperture 320 at the top surface 110 of the electric scooter 100 to introduce the seat 126 into the cavity 302 for storage, there may an aperture on front edge 106 of the electric scooter 100. Alternatively, there may be a panel on a side of outer casing 102 of electric scooter 100 through which the seat 126 is introduced into the cavity 302. For example, the panel may be on a left side of outer casing 102, on a right side of outer casing 102, or there may be panels on both sides of outer casing 102 permitting access to the cavity 302.

Also, cavity 302 as shown in FIG. 3 is only one example of providing a way to store seat 126. The cavity 302 may potentially be located in other portions of the electric scooter 100, such as in an area located above or below track 212. However, if seat 126 is not foldable, seat 126 is to be removed from the end of protruding seat pole 214 before folding can occur, as otherwise seat 126 interferes with the ability of protruding seat pole 214 to retract into the interior of electric scooter 100. FIG. 3 is only an example, and other embodiments provide for other places to store seat 126 after is it is removed from protruding seat pole 214.

Figure 4:
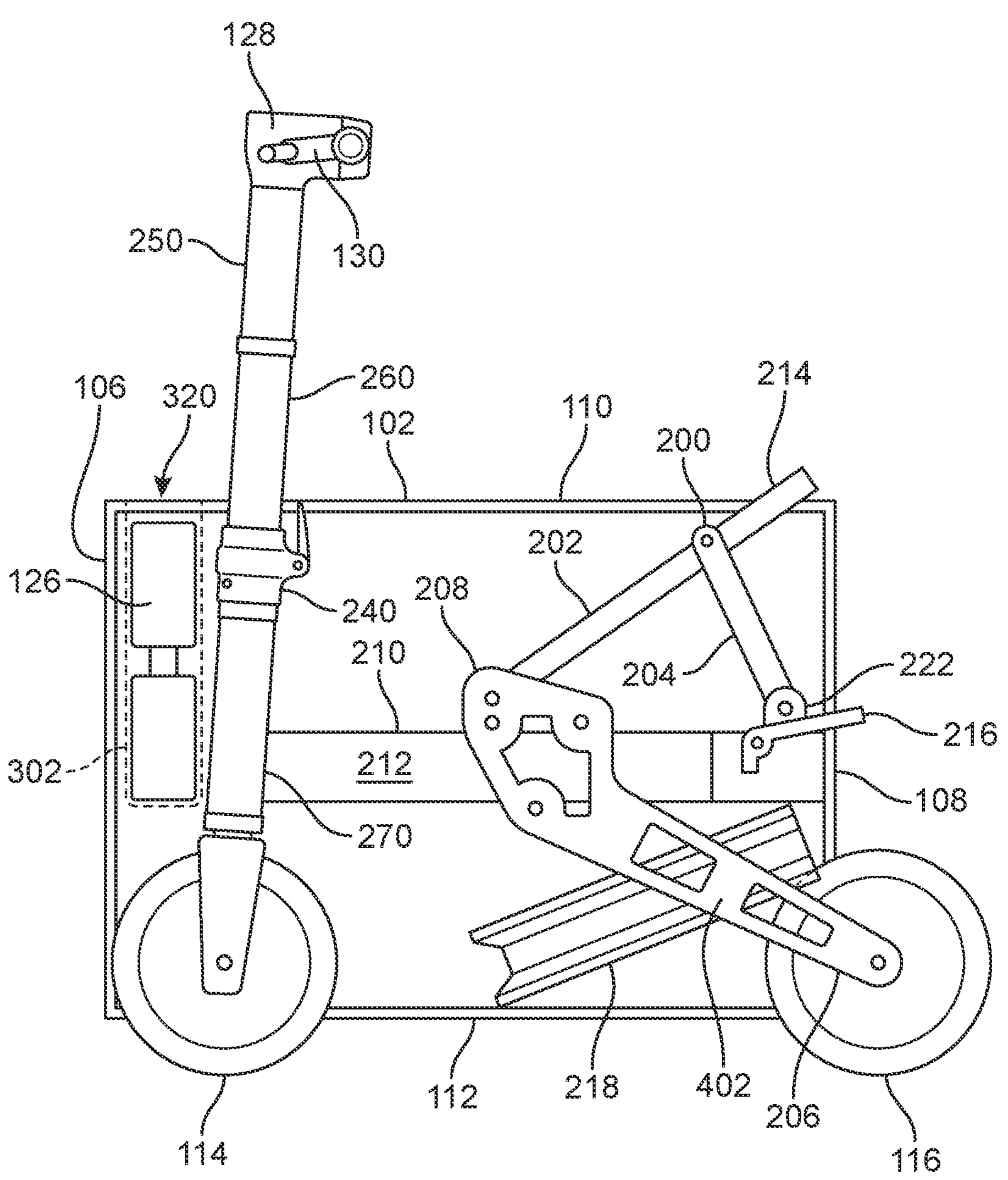
FIG. 4 is a side view showing internal components of the compact personal transport device of FIG. 1, in a configuration with a partially folded seat post and retracted rear wheel, in accordance with aspects of the present disclosure.

Referring now to FIG. 4, a side view showing internal components of the compact personal transport device of FIG. 1, in a configuration with a partially folded seat post and retracted rear wheel is shown. In FIG. 4, the fastening mechanism 216 is unlocked to release the carrier 208 and fixed pivot component 222. For example, fastening mechanism 216 may be a switch, a lever, or another mechanical device or mechanism that may be manipulated to release carrier 208, allowing carrier 208 to slide and fixed pivot component 222 to move. FIG. 4 also shows that fastening mechanism 216 protrudes from the rear surface 108 of electric scooter 100. By protruding, it makes it easier to toggle the fastening mechanism 216, though other embodiments may use another fastening mechanism 216 that does not protrude (e.g., a button).

Once linkage 204 is released after the release of fixed pivot component 222, linkage 204 is able to pivot at fixed pivot component 222 and to collapse onto a top of the sliding mechanism 210 of the electric scooter 100 as carrier 208 slides forward. As the linkage 204 collapses onto a top of the sliding mechanism 210, such movement allows the top portion of the seat post 202 to slide and collapse at the rear of the electric scooter 100 as the bottom portion of the seat post 202 slides and collapses toward the front of the electric scooter 100, in unison.

As the top portion of the carrier 208 is attached to the bottom portion of the seat post 202, when the carrier 208 slides along track 212 to the front of the electric scooter 100, it causes the bottom portion of the seat post 202 to slide towards the front of sliding mechanism 210. As carrier 208 slides forward, its linkage to seat post 202 pulls seat post 202 down into the electric scooter 100. Because seat post 202 is attached to protruding seat pole 214 and linkage 204, protruding seat pole 214 is also drawn into the interior of the electric scooter 100 as seat post 202 is drawn downwards and forwards.

However, the lower portion of carrier 208 is also attached to rear wheel arm 206, which is in turn attached to rear wheel 116. Accordingly, when carrier 208 slides forward, as discussed above, the rear wheel 116 is retracted into the vehicle body. Thus, the carrier 208 acts as a linkage mechanism between the seat post 202 and the protruding seat pole 214 and the rear wheel 116. Such a linkage creates a connection between the rear wheel arm 206 and the seat post 202 in such a way that it causes the protruding seat pole 214 to be raised or lowered in unison with the extension or retraction of the rear wheel 116.

Moreover, the rear wheel arm 206 may have a sliding guidance portion 402, where the sliding guidance portion 402 engages with lower track 218. As the carrier 208 slides towards the front of the electrical scooter 100, seat post 202, linkage 204, and protruding seat pole 214 collapse onto track 212. At the same time, the sliding guidance portion 402 of rear wheel arm 206 engages with lower track 218, guiding rear wheel 116 forward and into the interior of the electric scooter 100. In some embodiments, the lower track 218 may include two parallel grooves and the sliding guidance portion 402 of rear wheel arm 206 may include two regions that slide along the two parallel grooves of the lower track 218 as the rear wheel 116 transitions between the unfolded configuration and the folded configuration.

Referring now to FIG. 5, FIG. 5 is a side view showing internal components of the compact personal transport device of FIG. 1, in a configuration with a folded protruding seat pole 214 and a retracted rear wheel 116. In FIG. 5, the protruding seat pole 214, the rear wheel arm 206, and the rear wheel 116 are fully integrated into the interior of the electric scooter 100. Thus, carrier 208 is at the frontmost end of track 212 of sliding member 210. Above the attachment between the top end of linkage 204 and the seat post 202, protruding seat pole 214 lies folded within the interior of electric scooter 100, generally parallel to the top surface 110 and bottom surface 112 of the electric scooter 100.

Figure 6:
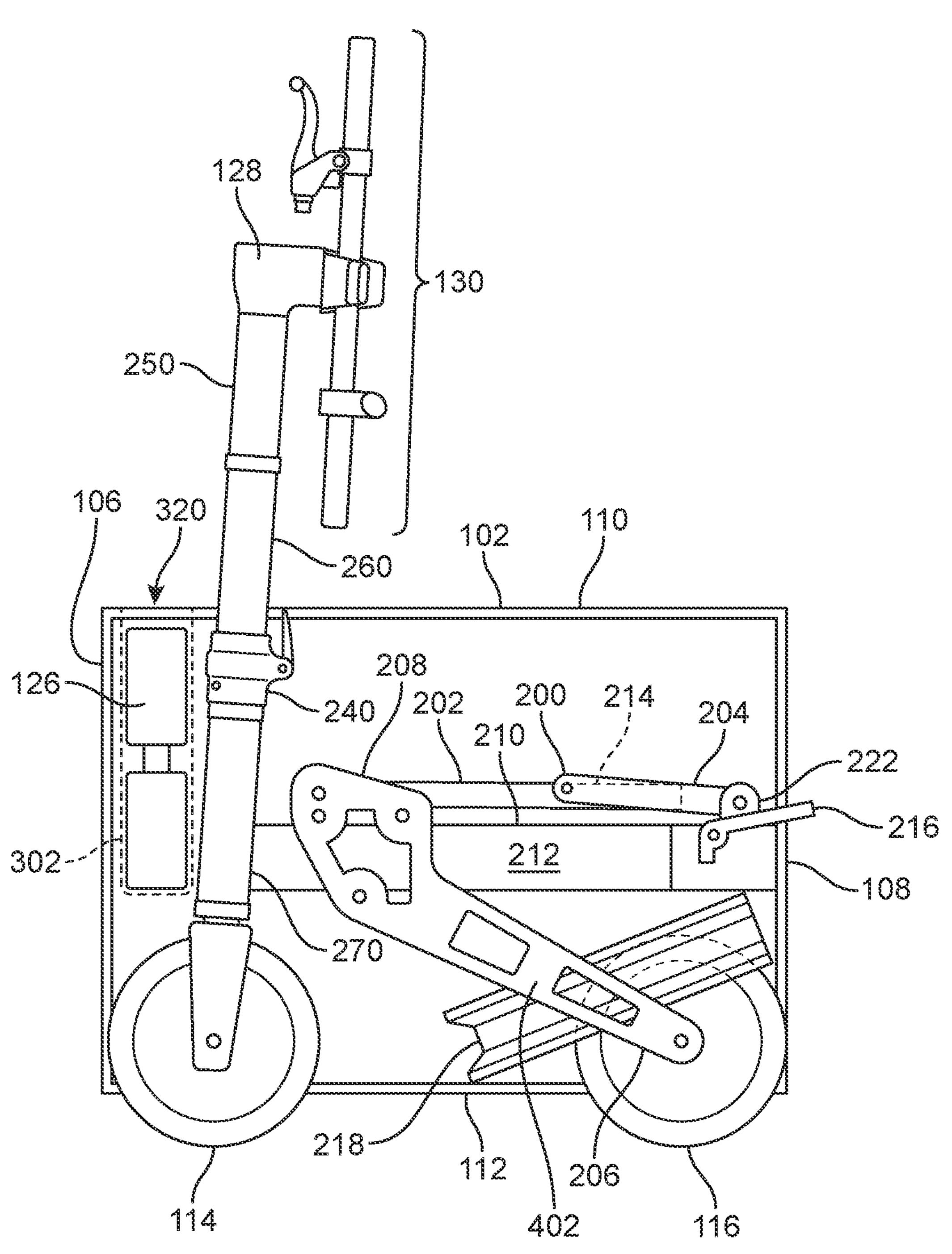
FIG. 6 is a side view showing internal components of the compact personal transport device of FIG. 1, in a configuration with a partially folded steering assembly, in accordance with aspects of the present disclosure.

FIG. 6 is a side view showing internal components of the compact personal transport device of FIG. 1, in a configuration with a partially folded steering assembly 128, in accordance with aspects of the present disclosure. In FIG. 6, the protruding seat pole 214 and the rear wheel 116 are retracted into the body of electric scooter 100. FIG. 6 shows an initial position of folding the steering assembly 128 for integration into the main body of the electric scooter 100.

In FIG. 6, the handlebar 130 of steering assembly 128 has been rotated. Prior to FIG. 6, the handlebar 130 of steering assembly 128 was oriented parallel to a surface of the ground. In FIG. 6, the handlebar 130 is shown as rotated so that the handlebar 130, along with steering assembly 128, form a uniform elongated member, in a vertical position. In FIG. 6, the steering assembly 128 is fully extended vertically, in that upper steering tube 250 extends from lower steering tube 260.

Figure 7:
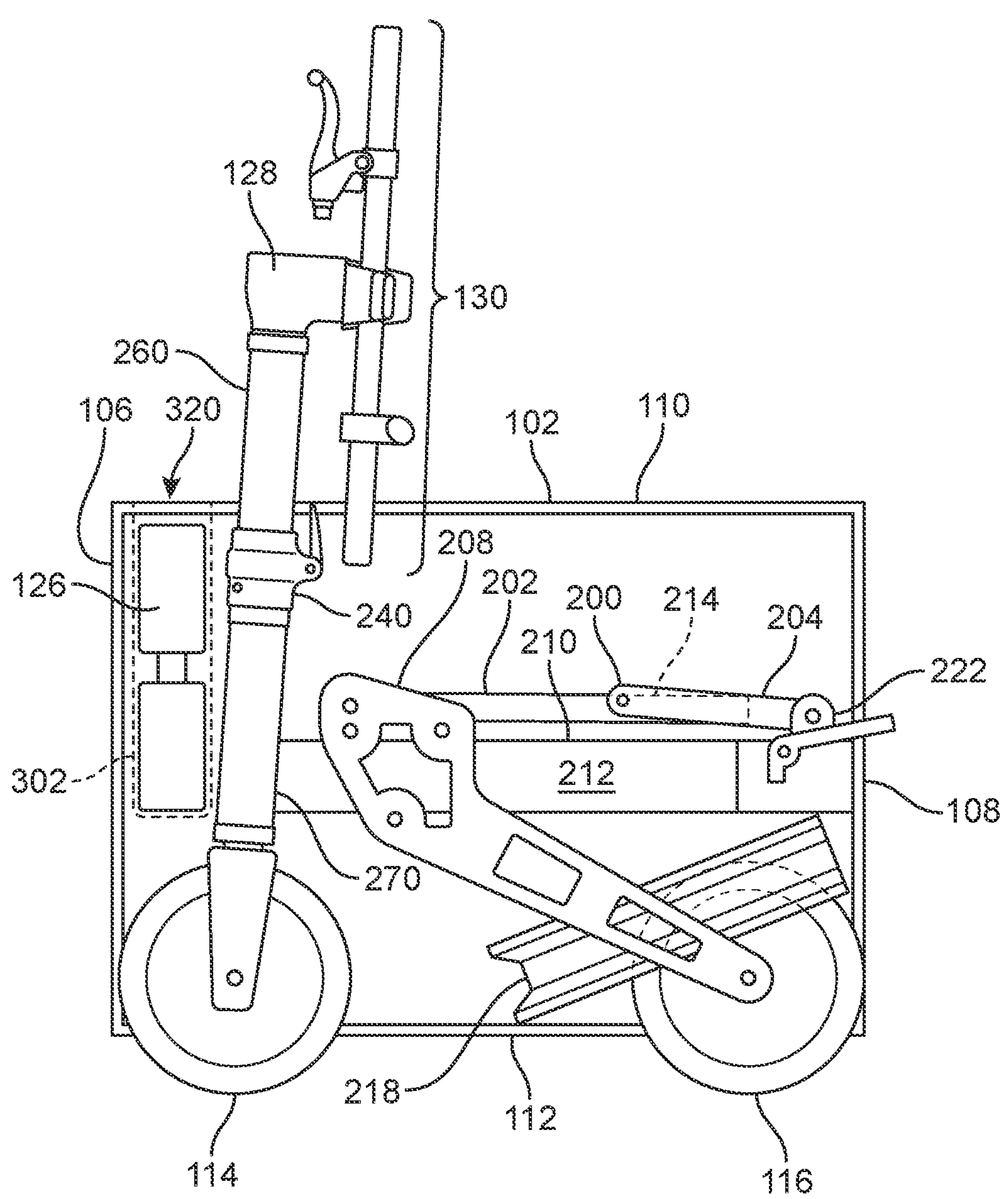
FIG. 7 is a side view showing internal components of the compact personal transport device of FIG. 1, in another configuration with a partially folded steering assembly, in accordance with aspects of the present disclosure.

FIG. 7 is a side view showing internal components of the compact personal transport device of FIG. 1, in a configuration with a partially folded steering assembly, in accordance with aspects of the present disclosure. As in FIG. 6, FIG. 7 shows the protruding seat pole 214 and the rear wheel 116 are retracted into the body of electric scooter 100. FIG. 7 shows that steering assembly 128 has been partially collapsed to facilitate folding. Thus, the primary difference between FIG. 6 and FIG. 7 is that upper steering tube 250 of steering assembly 128 telescopes into a lower steering tube 260 of steering assembly 710, providing that the telescoped steering assembly 128 has a smaller overall length. Hence, in FIG. 7, only the lower steering tube 260 is visible, in that the upper steering tube 250 is collapsed into the lower steering tube 260. In other embodiments, lower steering tube 260 may collapse into upper steering tube 250, leaving only the upper steering tube 250 visible.

When the steering assembly 128 is collapsed, in an example, the handlebar 130, which was previously twisted, extends into the interior of electric scooter 100. For example, a left side of handlebar 130 that previously reached or almost reached a top of the electric scooter 100 now protrudes into the interior of electric scooter 100. The right side of handlebar 130 extends a corresponding distance above the interface between the handlebar 130 and the steering assembly 128. However, because the handlebar 130 is symmetrical with respect to the steering assembly 128, it is also possible to fold the handlebar 130 in a way that the right side of the handlebar 130 extends downward and the left side of the handlebar 130 extends upward. That is, the handlebar 130 may be twisted clockwise or counterclockwise, depending on an arbitrary preference of the user of the electric scooter 100.

Figure 8:
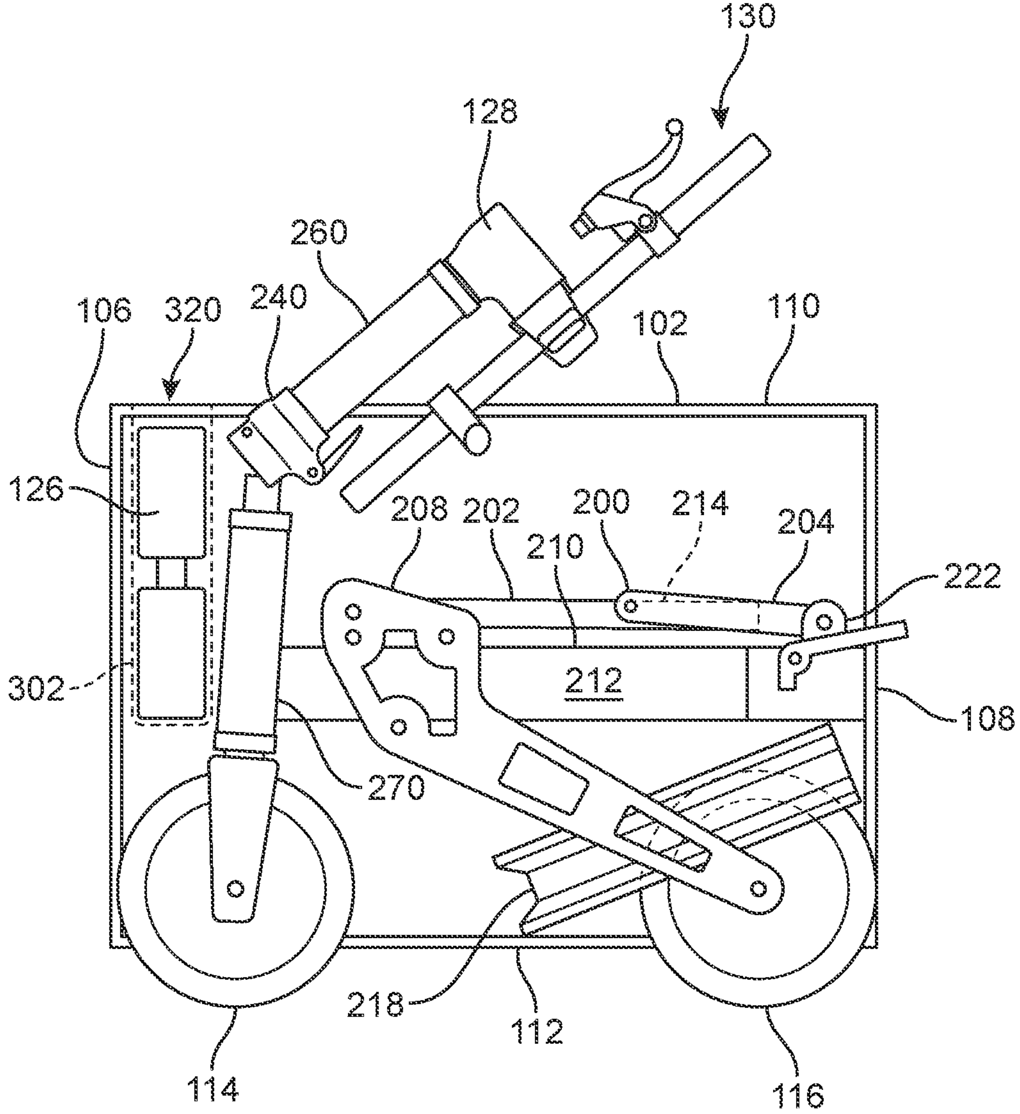
FIG. 8 is a side view showing internal components of the compact personal transport device of FIG. 1, in another configuration with a partially folded steering assembly, in accordance with aspects of the present disclosure.

FIG. 8 is a side view showing internal components of the compact personal transport device of FIG. 1, in a configuration with a partially folded steering assembly, in accordance with aspects of the present disclosure. As in FIGS. 6-7, FIG. 8 shows the protruding seat pole 214 and the rear wheel 116 are retracted into the body of electric scooter 100. In FIG. 8, the steering assembly 128 is shown as being folded into the interior of the electric scooter 100. As shown in FIG. 8, the steering assembly 128 pivots at steering hinge 240 to allow the steering assembly 128 to fold between the steering tube 260 and the front tube 270 that connects the steering assembly 128 to the front wheel 114 and to a front portion of sliding mechanism 210. As the steering assembly 128 folds into the electric scooter 100, the handlebar 130 folds beneath the steering tube 260.

FIG. 9 is a side view showing internal components of the compact personal transport device of FIG. 1, in a configuration with a folded steering assembly, in accordance with aspects of the present disclosure. As in FIGS. 6-8, FIG. 9 shows the protruding seat pole 214 and the rear wheel 116 are retracted into the body of electric scooter 100. FIG. 9 also provides that the steering assembly 128 has been integrated into the interior of electric scooter 100. In FIG. 9, the steering assembly 128 and the handlebar 130 are fully folded into the interior of the electric scooter 100. As fully folded, the electric scooter 100 is easier to carry because the electric scooter 100 no longer has the rear wheel 116, seat 126, or protruding seat pole 214 and the steering assembly 128 or the handlebar 130 extending outside the outer casing 102 that would otherwise make carrying the electric scooter 100 awkward.

FIG. 9 also shows an optional connective element 910 that may lock the steering assembly 128 in place, such as by anchoring the steering assembly 128 to either one or both of linkage 204 and protruding seat pole 214. In another embodiment, connective element 910 may lock the steering assembly 128 in place by anchoring the steering assembly 128 to seat post 202.

Figure 10:
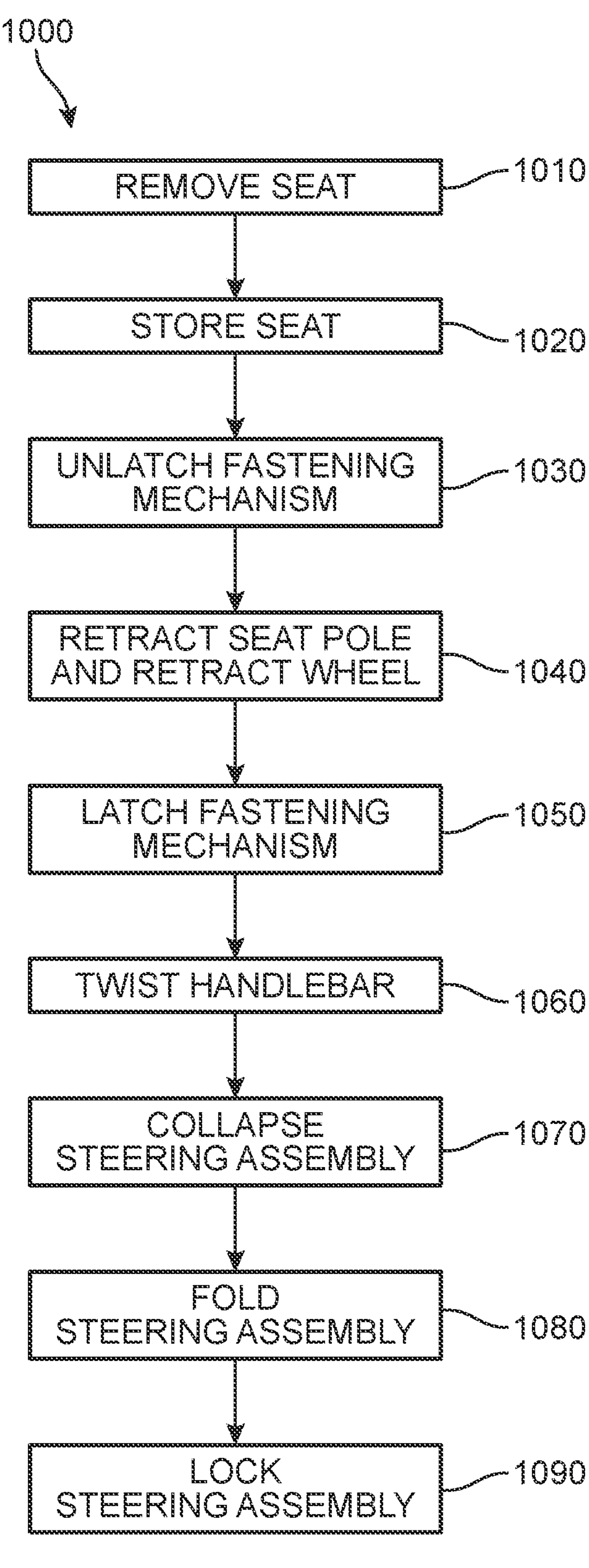
FIG. 10 is a flowchart showing steps included in a method of folding a compact personal transport device, in accordance with aspects of the present disclosure.

FIG. 10 is a flowchart 1000 showing steps included in a method of folding a compact personal transport device, in accordance with aspects of the present disclosure. Prior to the method of FIG. 10, the electric scooter 100 is in an unfolded or rideable state, as shown in FIGS. 1-2.

In FIG. 10, step 1010 includes removing a seat. Step 1020 includes storing the seat. After steps 1010 and 1020, the electric scooter is as shown in FIG. 3. Step 1030 includes unlatching a fastening mechanism. Step 1040 includes retracting a seat pole and retracting a rear wheel. FIG. 4 shows the electric scooter 100 while it is engaged in step 1040. Step 1050 includes latching a fastening mechanism. After steps 1030, 1040, and 1050, the electric scooter 100 is as shown in FIG. 5. Step 1060 includes twisting a handlebar. After step 1060, the electric scooter 100 is as shown in FIG. 6. Step 1070 includes collapsing a steering assembly. After step 1070, the electric scooter 100 is as shown in FIG. 7. Step 1080 includes folding a steering assembly. FIG. 8 shows the electric scooter 100 while it is engaged in step 1040. Step 1090 includes locking the steering assembly. FIG. 9 shows the electric scooter 100 after step 1090. These steps provide a simple, clear approach to transitioning between an unfolded or riding configuration and a folded or stowed configuration.

Figure 11:
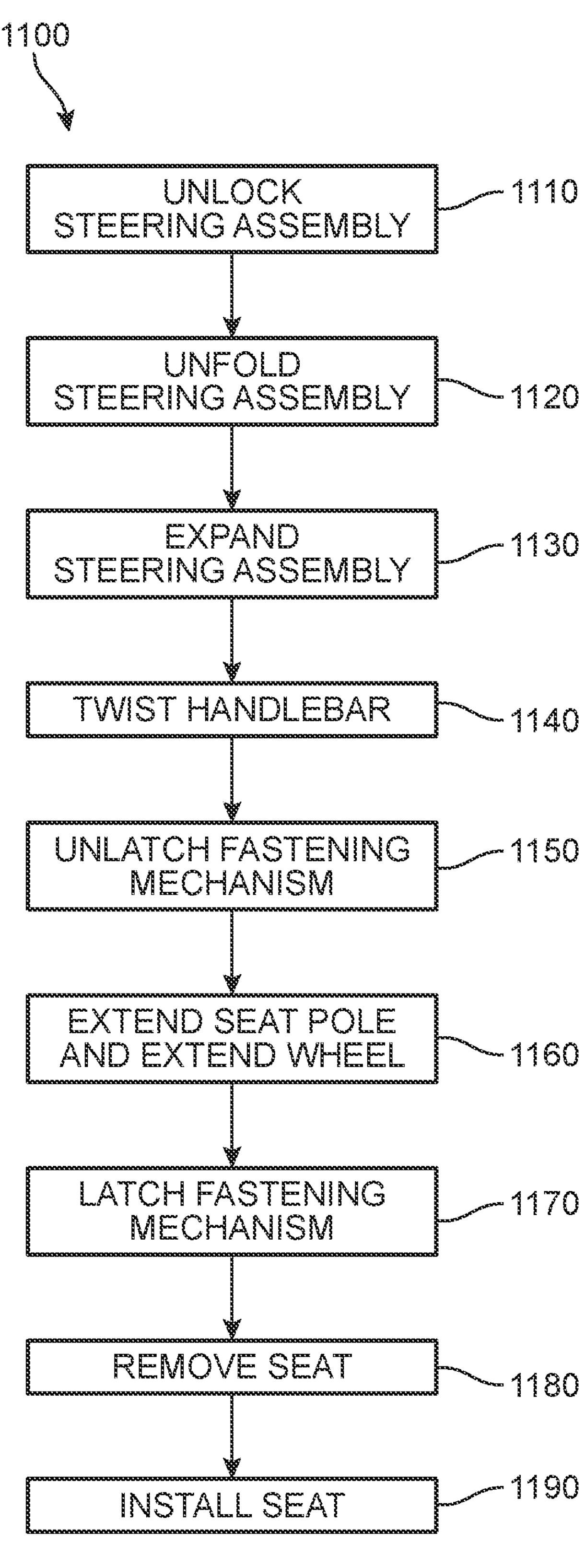
FIG. 11 is a flowchart showing steps included in a method of unfolding a compact personal transport device, in accordance with aspects of the present disclosure.

FIG. 11 is a flowchart 1100 showing steps included in a method of unfolding a compact personal transport device, in accordance with aspects of the present disclosure. In general, the steps shown in FIG. 11 are the inverse of those presented in FIG. 10, in that FIG. 11 provides how to take a folded electric scooter 100 and unfold the electric scooter 100 to result in an unfolded electric scooter 100 that may be ridden. Prior to the steps of FIG. 11, the electric scooter is as shown in FIG. 9. In FIG. 11, step 1110 includes unlocking the steering assembly. Step 1120 includes unfolding the steering assembly. FIG. 8 shows the electric scooter 100 while it is engaged in step 1120. Step 1130 includes expanding the steering assembly. After step 1130, the electric scooter 100 is as shown in FIG. 6. Step 1140 includes twisting the handlebar. After step 1140, the electric scooter 100 is as shown in FIG. 5. Step 1150 includes unlatching the fastening mechanism. Step 1160 includes extending the seat pole and extending the rear wheel. FIG. 4 shows the electric scooter while it is engaged in step 1160. Step 1170 includes latching the fastening mechanism. After step 1170, the electric scooter 100 is as shown in FIG. 3. Step 1180 includes removing the seat from where it was stowed. Step 1190 includes installing the seat, such as installing the seat onto the protruding seat pole. Thus, after step 1190, the electric scooter 100 is in a state corresponding to FIGS. 1 and 2 and is ready for a rider. These steps provide a simple, clear approach to transitioning between a folded or stowed configuration and an unfolded or riding configuration.

By using the rear wheel and seat linkage mechanism of the example embodiments, rear wheel 116 and protruding seat pole 214 are extended and retracted in unison. Such an approach makes it simpler for seat 126 of electric scooter 100 to provide a support surface for a user to sit upon in the unfolded or riding configuration. Embodiments also provide for seat 126 to be stowed inside of outer casing 102 of electric scooter 100 in a cavity 302 in the folded or stowed configuration. With this arrangement, electric scooter 100 may be a convenient personal transport device for a user to travel for "last-mile" or "first-mile" trips to a destination in the unfolded configuration and can be quickly converted to the folded configuration to allow the user to carry or transport once they reach their destination. Additionally, having a rear wheel and seat linkage mechanism as described is useful, in that the rear wheel 116 and protruding seat pole 214 may be managed in a simple, unified way rather than requiring separate extension and retracting steps, which may be clumsy, awkward, and inconvenience by comparison to the approaches presented herein.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A rear wheel and seat linkage mechanism for a personal transport device comprising:

a carrier, configured to slide along a track of a sliding mechanism;

a seat post, connected at a first end to a top portion of the carrier and connected at a second end to a protruding seat pole; and a rear wheel arm, connected to a rear wheel at a first end and connected at a second end to a bottom portion of the carrier, wherein the carrier is configured to slide between a front of the track and a rear of the track to transition, in unison, the seat post and the protruding seat pole above the track and the rear wheel and the rear wheel arm below the track between an unfolded configuration and a folded configuration; and wherein the carrier comprises a hollow region between the top portion of the carrier and the bottom portion of the carrier and the hollow region slides along the track.

2. The mechanism of claim 1, further comprising a linkage, connected at a first end to a portion of the seat post between the first end of the seat post and the second end of the seat post, and connected at a second end to the sliding mechanism, wherein the linkage pivots to transition the seat post and the protruding seat pole.

3. The mechanism of claim 2, further comprising a fixed pivot component at the second end of the linkage, wherein the linkage pivots at the fixed pivot component.

4. The mechanism of claim 3, wherein the fixed pivot component is held in place by a fastening mechanism, and the fastening mechanism is unlocked to allow the carrier to slide to perform the transitioning.

5. The mechanism of claim 1, wherein the rear wheel arm moves along a lower track of the personal transport device to transition the rear wheel between the unfolded configuration and the folded configuration.

6. The mechanism of claim 5, wherein the lower track comprises two parallel grooves and the rear wheel arm comprises two regions that slide along the two parallel grooves as the rear wheel transitions between the unfolded configuration and the folded configuration.

7. The mechanism of claim 4, wherein the fastening mechanism comprises a switch or lever.

8. A personal transport device comprising:

an outer casing;

a rear wheel;

a seat; and a linkage mechanism, the linkage mechanism comprising:

a carrier, configured to slide along a track of a sliding mechanism;

a seat post, connected at a first end to a top portion of the carrier and connected at a second end to a protruding seat pole;

a rear wheel arm, connected to the rear wheel at a first end and connected at a second end to a bottom portion of the carrier, wherein the carrier is configured to slide between a front of the track and a rear of the track to transition, in unison, the seat post and the protruding seat pole above the track and the rear wheel and the rear wheel arm below the track between an unfolded configuration and a folded configuration; and wherein the rear wheel arm moves along a lower track of the personal transport device to transition the rear wheel between the unfolded configuration and the folded configuration.

9. The personal transport device of claim 8, wherein the seat is attached to the protruding seat pole in the unfolded configuration and the seat is detached from the protruding seat pole and stored in a cavity of the outer casing of the personal transport device in the folded.

10. The personal transport device of claim 9, wherein the cavity is positioned in front of the sliding mechanism.

11. The personal transport device of claim 8, further comprising a linkage, connected at a first end to a portion of the seat post between the first end of the seat post and the second end of the seat post, and connected at a second end to the sliding mechanism, wherein the linkage pivots to transition the seat post and the protruding seat pole.

12. The personal transport device of claim 11, further comprising a fixed pivot component at the second end of the linkage, wherein the linkage pivots at the fixed pivot component.

13. The personal transport device of claim 12, wherein the fixed pivot component is held in place by a fastening mechanism, and the fastening mechanism is unlocked to allow the carrier to slide to perform the transitioning.

14. The personal transport device of claim 8, wherein the rear wheel is extended outside of the outer casing in the unfolded configuration.

15. The personal transport device of claim 8, wherein the lower track comprises two parallel grooves and the rear wheel arm comprises two regions that slide along the two parallel grooves as the rear wheel transitions between the unfolded configuration and the folded configuration.

16. A personal transport device comprising:

an outer casing;

a rear wheel;

a seat;

a linkage mechanism, the linkage mechanism comprising:

a carrier, configured to slide along a track of a sliding mechanism;

wherein the carrier is configured to slide between a front of the track and a rear of the track to transition, in unison, a seat post connected at a first end to a top portion of the carrier and connected at a second end to a protruding seat pole, situated above the track, and a rear wheel arm connected to the rear wheel at a first end and connected at a second end to a bottom portion of the carrier, situated below the track, between an unfolded configuration and a folded configuration; and a steering assembly, comprising a handlebar, wherein the steering assembly is configured to transition between a vertical position in the unfolded configuration and a collapsed position in the interior of the outer casing in the folded configuration.

17. The personal transport device of claim 16, wherein the steering assembly comprises an upper steering tube and a lower steering tube, and the steering assembly is configured to transition between an extended position in the unfolded configuration and a telescoped position in the folded configuration.

18. The personal transport device of claim 16, wherein the steering assembly is connected to a front wheel arm by a front hinge, and the steering assembly folds at the front hinge between the unfolded configuration and the folded configuration.

19. The personal transport device of claim 16, wherein the handlebar extends to a left side and a right side of the personal transport device when the personal transport device is in the unfolded configuration and is rotated into a vertical position when the personal transport device is in the folded configuration.

20. The personal transport device of claim 16, further comprising a connective element that locks the steering assembly to at least one of the linkage and the protruding seat pole when the personal transport device is in the folded configuration.

* * * * *